United States Patent [19]
Yamamoto

[11] 3,894,153
[45] July 8, 1975

[54] METHOD OF MEDICAL TREATMENT OF ASTHMA
[75] Inventor: Shinro Yamamoto, Saitama, Japan
[73] Assignee: Eisai Co., Ltd., Tokyo, Japan
[22] Filed: Oct. 30, 1973
[21] Appl. No.: 411,095

[30] Foreign Application Priority Data
Nov. 2, 1972 Japan.............................. 47-110058

[52] U.S. Cl. .............................................. 424/331
[51] Int. Cl............................................ A61k 27/00
[58] Field of Search .................................... 424/331

[56] References Cited
OTHER PUBLICATIONS

The Dispensatory of the U.S.A. 24th Ed., (1947), pp. 665–668, J. B. Lippincott Co. (Publishers).

Primary Examiner—Donald B. Moyer
Attorney, Agent, or Firm—Woodhams, Blanchard and Flynn

[57] ABSTRACT

The invention relates to a new use of menaquinone, and more particularly, to a method of medical treatment of asthma by administering menaquinone.

5 Claims, No Drawings

METHOD OF MEDICAL TREATMENT OF ASTHMA

BACKGROUND OF THE INVENTION

1. Field of the Invention

This invention relates to the treatment of asthma.

2. Description of the Prior Art

Menaquinone, also called vitamin $K_2$, is 2-methyl-3-tetraprenyl-1,4-naphthoquinone of the following structural formula:

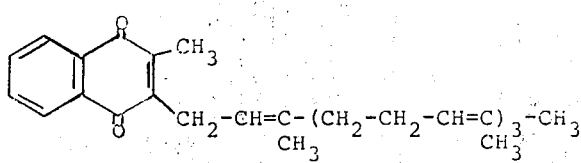

Menaquinone, vitamin $K_1$ and vitamin $K_3$ have been known as antihemorrhagic vitamins. It is considered that menaquinone enzymatically promotes in the body the formation of prothrombin synthesized in the liver. Lack of menaquinone causes a hemorrhagic condition because of the reduction of prothrombin.

SUMMARY OF THE INVENTION

We have discovered, unexpectedly in view of the prior art, that menaquinone is effective for treating asthma. In a clinical study of asthma, we have found that menaquinone is a quite useful medicine which can be administered to nearly all asthma patients without fear of significant side effects. The present invention has been accomplished on the basis of this finding.

An object of the invention is to provide a method for the medical treatment of asthma with menaquinone.

Another object of the invention is to provide a medically useful formulation containing menaquinone.

Menaquinone used in the present invention can be either that occuring in nature or that obtained by chemical synthesis. In the synthesis of menaquinone, many stereoisomers are formed. Among them, the all-trans type having the highest activity is preferred.

Menaquinone is an odorless, tasteless, yellow crystalline or oily substance easily soluble in ether and chloroform but essentially insoluble in water. Menaquinone is instable to light or alkalis. The melting point of menaquinone is about 34°–38°C.

The effective amount of menaquinone in accordance with this invention varies depending upon the specific condition of asthma to be treated, in accordance with the medical judgement of the attending physician. Generally, it is administered in an amount of 10–30 mg/day to the adult human patient. Dosage for children can be in the range of 2.5 to 15 mg. per day. The dosage for humans generally ranges from 2.5 to 50 mg. per day.

Menaquinone can be used in the form of a powder, tablet, capsule or by injection (parenterally).

If menaquinone is to be used in the form of a powder, it can be adsorbed on an inorganic vehicle or carrier such as magnesium carbonate, silicic acid anhydride (for example, Siloid, or Couplex), synthetic aluminum silicate or calcium phosphate or an organic vehicle such as lactose, corn starch or cellulose (for example, Avicel).

If menaquinone is to be used in the form of tablets or capsules, the menaquinone powder can be manufactured into tablets or capsules in a conventional manner.

If menaquinone is to be used in the form of an injectable liquid, it can be solubilized in water with a nonionic surfactant in a conventional manner. However, according to the conventional method wherein meaquinone is solubilized in water with a nonionic surfactant, white tubidity or crystallinity is apt to occur after a short period, and stable water solubilization is sometimes impossible. If a neutral oil is added to menaquinone when it is solubilized in water with a nonionic surfactant and then water is added thereto, a stable product in which no turbidity will be formed can be obtained.

The neutral oil can be any of the triglycerides of straight chain, saturated fatty acids and straight chain, unsaturated fatty acids of 8–20 carbon atoms and mixtures thereof. Examples of the neutral oils are vegetable oils such as purified rice bran oil, sesame oil, olive oil, castor oil and soybean oil. In addition, synthetic fatty acid triglycerides and fatty acid triglycerides of animal origin can be used.

As the nonionic surfactants, there can be used known nonionic surfactants, for example, hydrogenated castor oil/ethylene oxide adducts (such as Nikkol HCO and Emalex HC), sorbitan fatty acid ester/ethylene oxide adducts (such as Tween), alkylphenol/ethylene oxide adducts, fatty acid/ethylene oxide adducts and sorbitan/fatty acid esters (such as Span).

In the solubilization of fatty substances with nonionic surfactants, a surfactant of low HLB such as a sorbitan monofatty acid ester has been used in combination in many cases. Also in the injectionable formulations of the present invention, a surfactant of low HLB can be used in combination, and it is rather preferred by virtue of its synergistic effect. The neutral oil can be used in any quantity up to the equivalent quantity to menaquinone, preferably 20–50% by weight based on menaquinone. If the neutral oil is used in an excess quantity, the amount of the nonionic surfactant required is increased and this is undesirable for the medical purpose. When menaquinone is used in the form of injectable liquid, it can be mixed with the usual additives such as propylene glycol and glucose. The route of administration by injection can be intravenous, subcutaneous or intramuscular.

The effects of the present invention will be shown with reference to the results of clinical tests.

60 asthma patients were selected. 15 mg./day (adult) of menaquinone were administered orally in the form of capsule to the patients in dosages of 5 mg. three times a day after meals and 2.5 to 15 mg. a day for children. In the estimation of the effect of menaquinone, the degree of the condition of asthma were divided into 5 ranks as shown in Table 1. Ranks 1 and 2 indicate mild cases, ranks 3 and 4 indicate medium cases and rank 5 indicates severe cases.

The results are shown by three ranks of "remarkably effective," "effective" and "ineffective" on the basis of degree of improvement in the condition according to the method of Oshima, et al. [Yoshio Oshima, et al., "Desensitization therapy of asthma;" Allergy 14, 165 (1965)] (Table 2).

Table 1

| Condition | Rank | Symptoms |
|---|---|---|
| Mild | 1 | Stridor and cough but no attack of asthma |
| | 2 | Occasional light attack of asthma |
| | 3 | Frequent light attack or a considerably heavy attack (a few times a year) |
| Medium | 4 | Heavy attack (about once/month or once/week) or a continuous considerably heavy attack |
| Severe | 5 | Frequent heavy attack or serious, continuous attack |

Table 2

Results of Estimation (Oshima)
The effect during 1–3 years' therapy was summarized as follows, based on the condition at the first medical examination and an amnesis history.

| | |
|---|---|
| 1. Remarkably effective: | Change from severe condition to mild condition or from medium or mild condition to a condition of nearly no attack. |
| 2. Effective: | Improvement in the condition was recognized. |
| 3. Ineffectiveness: | Improvement in the condition was unclear or not recognized. |

The 60 patients comprised 10 patients of protracted type and 50 patients of seasonal type. All the latter had experienced a season of occurrence of the attack. The results of the clinical tests are shown in Table 3.

Table 3

Clinical Effect of Menaquinone Against Asthma

| Condition before treatment | Remarkably Effective | Effective | Ineffective | Total | Rate of effective cases (%) | Rate of remarkably effective cases (%) |
|---|---|---|---|---|---|---|
| Severe | 1 | 4 | 3 | 8 | 62.5 | (12.5) |
| Medium | 12 | 18 | 5 | 35 | 85.7 | (34.3) |
| Mild | 8 | 9 | 0 | 17 | 100.0 | (47.0) |
| Total | 21 | 31 | 8 | 60 | 86.6 | (35.0) |

The details of the 21 remarkably effective cases were as shown in Table 4. All of the cases experienced the therapy for longer than 11 months and most of them experienced the therapy for longer than 1 year.

Table 4

Cases of the Remarkable Effects of Menaquinone Against Asthma

| Patient | | Age | Sex | Type | Condition | Dose/day | Period (months) |
|---|---|---|---|---|---|---|---|
| 1 | T.M. | 53 | F | Mixed | Medium | 5 mg | 12 |
| 2 | K.S. | 10 | M | Atopy | Mild | 5 | 16 |
| 3 | M.S. | 10 | F | Atopy | Mild | 10 | 14 |
| 4 | M.N. | 7 | M | Atopy | Mild | 5 | 16 |
| 5 | S.Y. | 4 | M | Atopy | Medium | 2.5 | 16 |
| 6 | A.S. | 13 | M | Atopy | Severe | 15 | 17 |
| 7 | H.M. | 40 | F | Mixed | Medium | 15 | 12 |
| 8 | A.Y. | 10 | M | Mixed | Mild | 5 | 17 |
| 9 | N.S. | 39 | F | Mixed | Medium | 10 | 19 |
| 10 | N.I. | 5 | F | Atopy | Mild | 5 | 15 |
| 11 | K.E. | 45 | M | Mixed | Medium | 15 | 11 |
| 12 | T.M. | 11 | M | Mixed | Medium | 5 | 12 |
| 13 | K.S. | 32 | F | Infection | Mild | 15 | 13 |
| 14 | S.M. | 54 | F | Infection | Medium | 15 | 20 |
| 15 | Y.T. | 51 | F | Mixed | Medium | 15 | 19 |
| 16 | K.Y. | 32 | M | Atopy | Medium | 15 | 20 |
| 17 | T.T. | 18 | M | Mixed | Medium | 15 | 20 |
| 18 | N.M. | 11 | M | Atopy | Mild | 5 | 13 |
| 19 | K.Y. | 15 | M | Atopy | Mild | 5 | 11 |
| 20 | M.T. | 47 | F | Atopy | Medium | 15 | 12 |
| 21 | T.S. | 29 | M | Mixed | Medium | 15 | 15 |

The results were classified into atopy type, infection type and mixed type as shown in Table 5.

According to said classification, an inclination was found that remarkably effective cases were noted chiefly in the atopy type and mixed type and effective cases were noted in the atopy type.

Examples of especttially effective medical formulations will be given below, but the invention is not limited thereto.

EXAMPLE 1

| Menaquinone-4 | 5.0 mg |
|---|---|
| Cellulose crystallite | 80.0 |
| Starch | 40.0 |
| Hydroxypropylcellulose | 5.0 |

The above components are mixed together to obtain a powder-granule product. If necessary or desired, tablets or capsules can be prepared from the product.

Table 5

| Type | Remarkably effective | Effective | Ineffective | Total | Rate of effective cases (%) | Rate of remarkably effective cases (%) |
|---|---|---|---|---|---|---|
| Atopy | 10 | 17 | 1 | 28 | 96.4 | (35.7) |
| Mixed | 9 | 11 | 5 | 25 | 80.0 | (36.0) |
| Infection | 2 | 3 | 2 | 7 | 71.4 | (28.6) |
| Total | 21 | 31 | 8 | 60 | | |

EXAMPLE 2

| Menaquinone-4 | 5.0 mg |
|---|---|
| Silicic acid anhydride | 70.0 |
| Starch | 20.0 |
| Lactose | 20.0 |

The above components are mixed together to obtain a powdery product. If necessary or desired, tablets or capsules can be prepared from the product.

EXAMPLE 3

| Menaquinone-4 | 10.0 mg |
|---|---|
| Hydrogenated castor oil/ polyoxyethylene-60 mole-ether | 40.0 |
| Propylene glycol | 60.0 |
| Soybean oil | 3.0 |
| Sorbitan monostearate | 2.0 |
| Glucose | 50.0 |
| Water for injection | ad 1 ml. |

Menaquinone-4, hydrogenated caster oil/polyoxyethylene-60 mole-glycol-ether, propylene glycol, soybean oil and sorbitan monostearate are mixed together. The mixture is rendered molten on a water bath to obtain a homogeneous mixture. The mixture is solubilized with stirring and the glucose and then water added to make the total quantity 1 ml. The product is subjected to filtration and charged in a brown glass ampoule. Air in the ampoule is replaced with nitrogen. The ampoule is fused by melting. It is suitable for injecting by the intravenous, subcutaneous or intramuscular route.

EXAMPLE 4

| | |
|---|---|
| Menaquinone-4 | 10.0 mg |
| Hydrogentated castor oil/poly-oxyethylene-60 mole-ether | 74.0 |
| Sesame oil | 3.0 |
| Propylene glycol | 50.0 |
| Glucose | 50.0 |
| Sodium dihydrogenphosphate | 2.0 |
| Sodium hydrogenphosphate | 0.4 |
| Water for injection | ad 1 ml. |

An injectable formulation is prepared in the same manner as in Example 3. It is suitable for injecting by the intravenous, subcutaneous or intramuscular route.

The embodiments of the invention in which an exclusive property or privilege is claimed are defined as follows:

1. A method of treating asthma which comprises administering orally to a human suffering from asthma, from 2.5 to 50 mg of menaquinone per day.

2. A method as claimed in claim 1 wherein the human is an adult and the total daily dosage amount is from 10 to 30 mg.

3. A method as claimed in claim 1 wherein the human is a child and the total daily dosage amount is from 2.5 to 15 mg.

4. A method as claimed in claim 1 wherein the menaquinone is orally administered in divided unit dosage forms.

5. A method as claimed in claim 1 wherein the asthma is of the atopy type.

* * * * *